(12) United States Patent
Schlachter et al.

(10) Patent No.: US 10,948,371 B2
(45) Date of Patent: Mar. 16, 2021

(54) METHOD FOR MANUFACTURING A PRESSURE TRANSMITTER SYSTEM

(71) Applicant: Endress+Hauser SE+Co. KG, Maulburg (DE)

(72) Inventors: Marc Andreas Schlachter, Wehr (DE); Stefan Kropf, Kleines Wiesental (DE); Dietmar Leuthner, Weil am Rhein (DE); Markus Berger, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 118 days.

(21) Appl. No.: 16/302,236

(22) PCT Filed: May 17, 2017

(86) PCT No.: PCT/EP2017/061805
§ 371 (c)(1),
(2) Date: Nov. 16, 2018

(87) PCT Pub. No.: WO2017/198692
PCT Pub. Date: Nov. 23, 2017

(65) Prior Publication Data
US 2019/0277719 A1   Sep. 12, 2019

(30) Foreign Application Priority Data
May 19, 2016  (DE) .................... 10 2016 109 252.5

(51) Int. Cl.
*G01L 19/00* (2006.01)
*G01L 19/06* (2006.01)

(52) U.S. Cl.
CPC ...... *G01L 19/0046* (2013.01); *G01L 19/0618* (2013.01); *G01L 19/0627* (2013.01); *G01L 19/06* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 4,833,922 A * 5/1989 Frick .................. G01L 19/0038
73/706
2005/0225035 A1  10/2005 Sundet
(Continued)

FOREIGN PATENT DOCUMENTS

CN       100472115 C    3/2009
CN       105509935 A    4/2016
(Continued)

OTHER PUBLICATIONS

Search Report for German Patent Application No. 10 2016 109 252.5, German Patent Office, dated Feb. 21, 2017, 6 pp.
(Continued)

*Primary Examiner* — Andre J Allen
(74) *Attorney, Agent, or Firm* — Christopher R. Powers; Endress+Hauser (USA) Holding Inc.

(57) ABSTRACT

The present disclosure includes a method for manufacturing a pressure transmitter system, comprising steps as follows: providing a capillary adapter and a pressure transmitter, which has at least one diaphragm platform and an isolating diaphragm, which is connected along at least one edge gas-tightly with the diaphragm platform to form a pressure chamber between the isolating diaphragm and the diaphragm platform; welding the capillary adapter to the pressure transmitter; arranging the capillary tube and a capillary tube interface of the capillary adapter relative to one another; welding the capillary tube to the capillary adapter; and plugging a protective hose onto a protective hose seat of the capillary adapter.

16 Claims, 3 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16

See application file for complete search history.

(56) References Cited

U.S. PATENT DOCUMENTS

| | | | |
|---|---|---|---|
| 2005/0284227 A1* | 12/2005 | Broden | G01L 19/0681 73/708 |
| 2006/0162459 A1* | 7/2006 | Broden | G01L 19/0645 73/715 |
| 2012/0085180 A1 | 4/2012 | Carton et al. | |
| 2020/0171480 A1* | 6/2020 | Bornmann | B01L 3/0275 |

FOREIGN PATENT DOCUMENTS

| | | |
|---|---|---|
| DE | 853826 | 10/1952 |
| DE | 1665749 U | 10/1953 |
| DE | 2531787 A1 | 2/1977 |
| DE | 102005012437 A1 | 10/2005 |
| DE | 102014110615 A1 | 1/2016 |
| EP | 0853826 A1 | 7/1998 |

OTHER PUBLICATIONS

Search Report for International Patent Application No. PCT/EP2017/061805, WIPO, dated Aug. 8, 2017, 15 pp.

* cited by examiner

METHOD FOR MANUFACTURING A PRESSURE TRANSMITTER SYSTEM

CROSS-REFERENCE TO RELATED APPLICATIONS

The present application is related to and claims the priority benefit of German Patent Application No. 10 2016 109 252.5, filed on May 19, 2016 and International Patent Application No. PCT/EP2017/061805, filed on May 17, 2017 the entire contents of which are incorporated herein by reference.

TECHNICAL FIELD

The invention relates to a method for manufacturing a pressure transmitter system as well as to a pressure transmitter system.

BACKGROUND

Pressure transmitter systems for transferring a media pressure usually comprise a body of the pressure transmitter, i.e. a diaphragm platform with a media facing surface, and an isolating diaphragm, which is connected along at least one edge gas-tightly with the body of the pressure transmitter to form a pressure chamber between the isolating diaphragm and the body of the pressure transmitter, wherein a duct extends through the body of the pressure transmitter to the pressure chamber, and the pressure chamber and the duct are filled with a pressure transfer liquid, in order to transfer to a pressure receiver a media pressure acting on the isolating diaphragm. Such pressure transmitter systems further comprise a capillary tube and a capillary adapter, wherein the capillary tube is connected via the capillary adapter to the body of the pressure transmitter, i.e. diaphragm platform, in order to transfer the media pressure to the pressure receiver.

In order to manufacture such a pressure transmitter system, a complicated and expensive manufacturing process is needed. In such case, first, the capillary tube is inserted into a traversing bore of the capillary adapter, until the tube has traveled to become essentially flush with an end face of the capillary adapter. At this end face, then the capillary tube is welded to the capillary adapter, before the adapter with the capillary tube is affixed to the body of the pressure transmitter. The affixing of the capillary adapter with the capillary tube to the body of the pressure transmitter occurs then and requires due to the welded attachment of the capillary tube a manual adjusting the capillary tube during the welding.

In the next step, a protective hose is drawn over the capillary tube and led at one end into a bore of the capillary adapter, the bore extending to a defined depth in the longitudinal direction of the capillary adapter and communicating with the traversing bore. The protective hose so introduced into the bore is then affixed to the capillary adapter. This manufacturing process has, such as just indicated, the disadvantage that it is relatively complicated and, thus, also expensive.

Furthermore, pressure transmitter systems manufactured in such a manner have a poor durability in the presence of corrosion promoting environmental conditions, since the weld seam between capillary adapter and capillary tube is not accessible for subsequent treatment and therefore often becomes corroded. This leads, in turn, to the fact that, in the end, oil escapes at the corroded location.

A further disadvantageous aspect of pressure transmitters manufactured in such a manner is that the bore of the capillary adapter, into which the protective hose is inserted, can collect liquids, for example, rain water, which leads, in turn, to increased corrosion in the transition between the bore and the traversing bore.

SUMMARY

It is an object of the invention to provide a simplified and more economical method for manufacturing a pressure transmitter system, as well as to provide a simpler and more economically manufacturable pressure transmitter system having increased life expectancy.

The object of the invention is achieved by a method for manufacturing a pressure transmitter system as well as by a pressure transmitter system.

As regards the method, the object is achieved by a method for manufacturing a pressure transmitter system, comprising steps as follows:
  providing a capillary adapter and a pressure transmitter, wherein the pressure transmitter has at least one diaphragm platform and an isolating diaphragm, which is connected along at least one edge gas-tightly with the diaphragm platform to form a pressure chamber between the isolating diaphragm and the diaphragm platform;
  welding the capillary adapter to the pressure transmitter;
  arranging the capillary tube and a capillary tube interface of the capillary adapter relative to one another;
  welding the capillary tube to the capillary adapter;
  plugging a protective hose onto a protective hose seat of the capillary adapter.

According to the invention, a manufacturing process is provided, in the case of which the sequence of the welding processes is changed such that the pressure transmitter system can be formed from the inside out. Since the welds are performed by standard in a protective gas atmosphere, oxide films and scaling in the interior of the capillary tube can be prevented. Moreover, the corrosion protection is improved externally by the protective gas cover. Likewise the structural modification prevents that an environmental medium, such as, for example, rain water, can collect in critical, corrosion susceptible regions.

An advantageous form of embodiment of the method of the invention provides that the protective hose is affixed at least spot-wise to the capillary adapter, especially by welding, after the plugging onto the capillary adapter.

An alternative form of embodiment of the method of the invention provides that the protective hose is affixed by pressing it against the capillary adapter.

Another advantageous form of embodiment of the method of the invention provides that the welding of the capillary tube to the capillary adapter is performed by means of an orbital, tungsten inert gas (TIG) or laser welding process.

Another advantageous form of embodiment of the method of the invention provides that the capillary tube interface of the capillary adapter is embodied in such a manner that the capillary tube interface has a first stop and the capillary tube is arranged in the capillary tube interface such that it extends to the first stop.

An alternative form of embodiment of the method of the invention provides that the arrangement of the capillary tube and the capillary tube interface relative to one another as well as the welding occur with butt orientation.

Another advantageous form of embodiment of the method of the invention provides that the protective hose is plugged onto the protective hose seat such that it extends to an outer ledge of the capillary adapter.

Another advantageous form of embodiment of the method of the invention provides that the arranging of the capillary tube and the capillary tube interface of the capillary adapter relative to one another occurs after welding of the capillary adapter to the pressure transmitter.

As regards the pressure transmitter system, the object is achieved by a pressure transmitter system comprising a pressure transmitter, a capillary adapter, a capillary tube and a protective hose, wherein the capillary adapter has a basic body with an inner, connecting, oil path, which extends in the longitudinal direction from a first end to a second end of the basic body, wherein the first end of the capillary adapter has a pressure transmitter connector, as a result of which the capillary adapter is connectable with the pressure transmitter and the second end has a capillary tube interface, with which the oil path communicates, wherein the capillary tube and the capillary tube interface are embodied in such a manner that the capillary tube is introducible to a predetermined depth into the capillary tube interface, which closely surrounds the capillary tube, wherein the second end of the basic body is embodied, furthermore, in such a manner in the form of a protective hose seat that the protective hose is pluggable externally over the protective hose seat with a close fit.

An advantageous, further development of the pressure transmitter system of the invention provides that the protective hose seat includes an outer, first ledge serving as a stop for the protective hose.

Another advantageous, further development of the pressure transmitter system of the invention provides that the capillary tube interface includes at the transition to the oil path an inner, second ledge serving as a stop for the capillary tube.

Another advantageous, further development of the pressure transmitter system of the invention provides that the capillary tube interface has an essentially constant, inner diameter and extends to the second ledge. Especially, the further development provides that the inner diameter of the capillary tube interface is selected such that it essentially equals an outer diameter of the capillary tube, so that the capillary tube is closely surrounded by the capillary tube interface.

Another advantageous, further development of the pressure transmitter system of the invention provides that the pressure transmitter has a diaphragm platform and an isolating diaphragm, wherein the isolating diaphragm is to connected along at least one edge gas-tightly with the diaphragm platform to form a pressure chamber between the isolating diaphragm and the diaphragm platform, and wherein a filling adapter with a filling closure is secured to the diaphragm platform and the capillary adapter is welded to the filling adapter of the pressure transmitter.

An alternative further development of the pressure transmitter system of the invention provides that the diaphragm platform has a filling means and the capillary adapter is welded to the diaphragm platform of the pressure transmitter.

BRIEF DESCRIPTION OF THE DRAWINGS

The invention will now be explained in greater detail based on the appended drawing, the figures of which show as follows.

DETAILED DESCRIPTION

Figure 1:
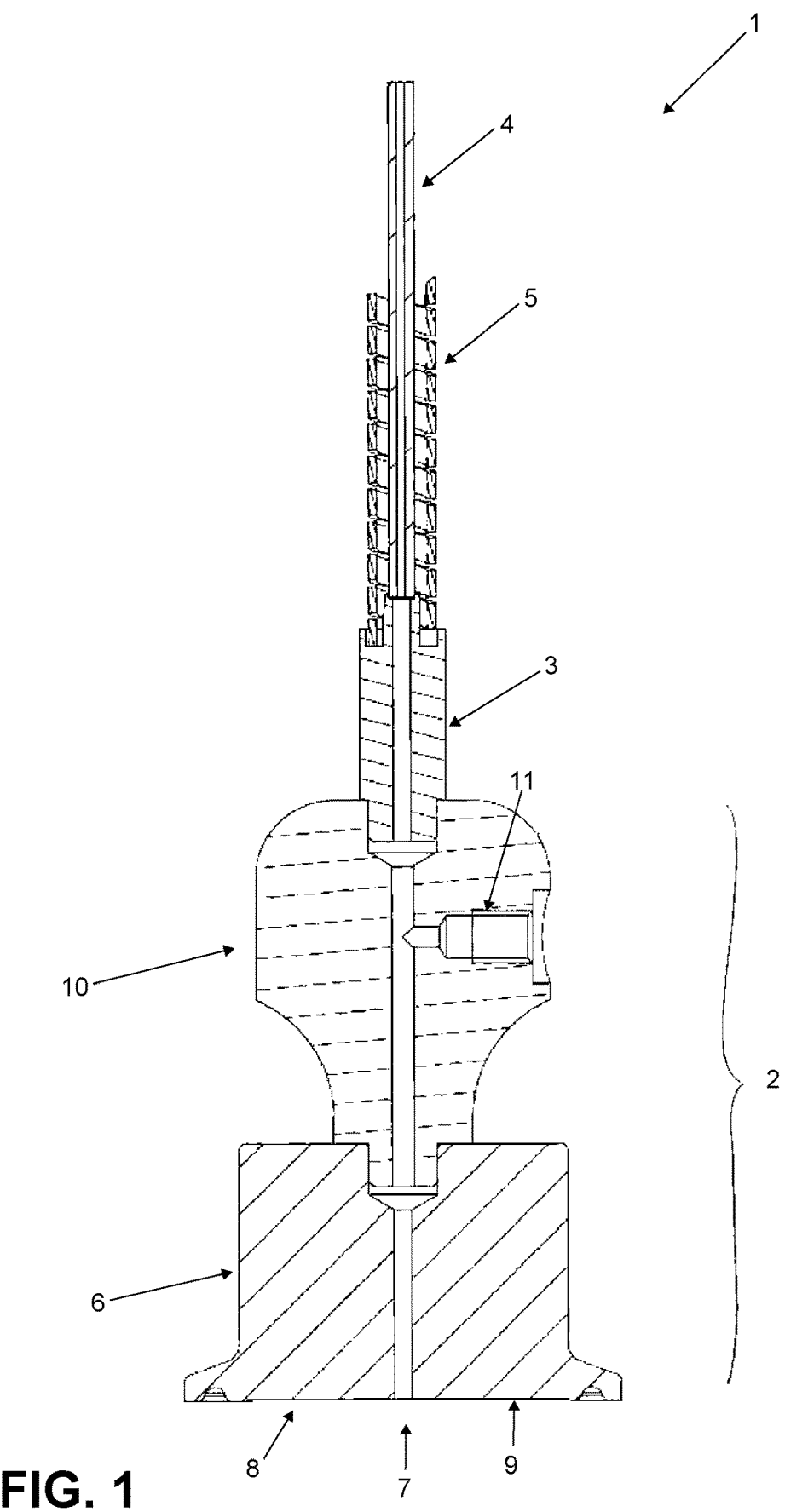
FIG. 1 shows a sectional view of a pressure transmitter system of the invention.

FIG. 1 shows a sectional view of a pressure transmitter system 1 of the invention, which includes a pressure transmitter 2, a capillary adapter 3, a capillary tube 4 and a protective hose 5.

The pressure transmitter 2 includes a metal diaphragm platform 6, which is manufactured as a turned part, for example, from a piece of stainless steel, and is essentially axisymmetric. The metal diaphragm platform 6 has a media facing surface 7 and an isolating diaphragm 8, which is connected along at least one edge gas-tightly and pressure resistantly with the diaphragm platform 6 to form a pressure chamber 9 between the isolating diaphragm 8 and the diaphragm platform 6.

Furthermore, the pressure transmitter 2 shown in FIG. 1 includes a filling adapter 10, which has an integrated filling means 11 for filling the pressure transmitter system with a pressure transfer liquid. The filling adapter can likewise be manufactured as a turned part and, thus, also be essentially axisymmetric. Also, as regards choice of material, stainless steel has proved to be advantageous.

As shown in FIG. 1, the filling adapter can be embodied as a separate element and joined with the diaphragm platform, so that these together form the pressure transmitter. Alternatively to this and not shown in FIG. 1, the diaphragm platform 6 of the pressure transmitter can have an integrated filling means 11. This means that, in this case, the pressure transmitter does not have a separate filling adapter.

The filling means 11 typically includes a filling inlet, via which a pressure transfer liquid is introducible, and a filling closure for closing the filling inlet after the filling procedure. The filling closure can be, for example, a ball valve or a screw.

Depending on whether the pressure transmitter 2 has a separate filling adapter 10 or an integrated filling means 11, the capillary adapter 3 is welded either to the filling adapter of the pressure transmitter or to the diaphragm platform 6 of the pressure transmitter.

Figure 2:
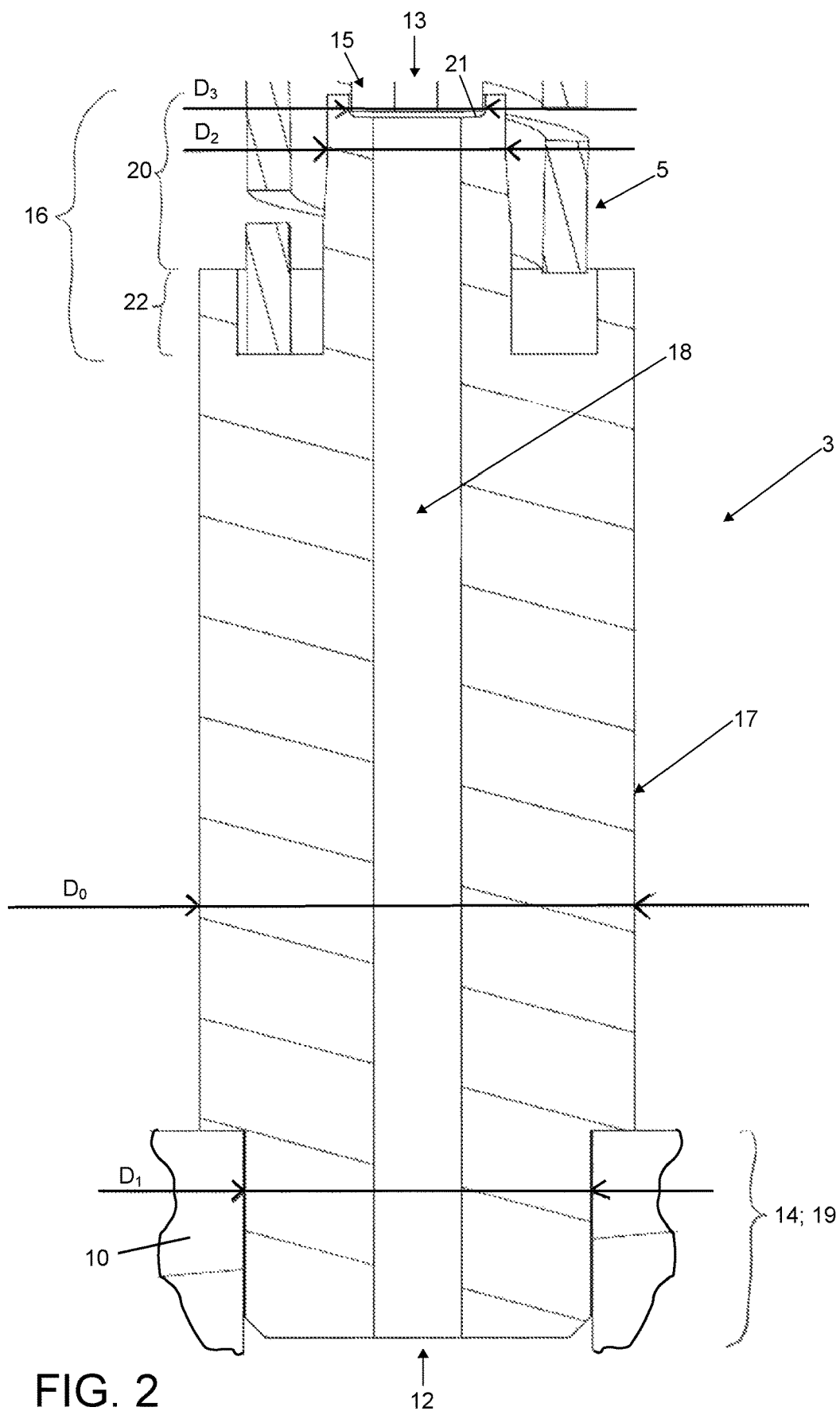
FIG. 2 shows a sectional view of the capillary adapter.

The capillary adapter 3, which is shown in cross-section in FIG. 2, comprises a metal, basic body 17 with a first end 12 and a second end 13 opposite from the first end 12. Also the capillary adapter is typically manufactured as a turned part, so that it is essentially axisymmetric and rotationally symmetric with an outer diameter $D_0$. Located in the basic body is an inner, connecting, oil path 18, which extends through the basic body 17 in the longitudinal direction from the first end 12 to the second end 13. The oil path 18 can be provided, for example, as shown in FIGS. 1 and 2, by a bore and, thus, be in the form of a capillary line.

On the first end 12, the capillary adapter 3 includes a pressure transmitter connector 14, for example, in the form a turned, first ledge 19 with a first diameter $D_1$. With the pressure transmitter connector 14, the capillary adapter 3 engages the filling adapter 10, which has an opening matching the first diameter $D_1$ of the first ledge 19. The first ledge 19 and the hole are matched and embodied, in such case, in such a manner relative to one another that the first ledge 19 just fits into the hole.

On the second end 13 lying opposite the first end, the capillary adapter includes a protective hose seat 16, which is embodied in such a manner that the protective hose 5, only partially shown in FIG. 2, is pluggable externally over and onto the protective hose seat 16 with a tight fit. The protective hose seat 16 has, for this, preferably an outer, second ledge 20 with a second diameter $D_2$. Diameter $D_2$ is selected in such a manner that the protective hose 5 is externally tightly pluggable over and onto the protective hose seat 16. Furthermore, the protective hose seat 16 includes an annular depression 22, which lies in the basic body between an external surface of the basic body and the inner oil path or the capillary line and serves for accommodating the protective hose 5.

On the second end 13, the capillary adapter 3 includes, furthermore, a capillary tube interface 15. This capillary interface is embodied in the form of a capillary tube opening having a third diameter $D_3$, wherein the inner oil path 18, or the capillary line, communicates with the capillary tube opening. The capillary tube opening 15 is preferably so embodied in such case that, at a transition between the inner oil path 18, or the capillary line, and the capillary tube opening, an inner third ledge 21 is formed. The inner ledge serves, in this case, as a stop for the capillary tube 4 in the assembly of the pressure transmitter system. Accordingly, the depth of the capillary tube opening fixes the penetration depth of the capillary tube into the capillary adapter in the assembly of the pressure transmitter system. Preferably, the penetration depth is so selected that the capillary tube is only partially insertable into the capillary adapter and not, such as, for example, known from the state of the art, that the capillary tube passes completely through the capillary adapter. Furthermore, the capillary tube opening 15 has an essentially constant diameter $D_3$. The inner diameter $D_3$ is selected in such a manner that the capillary tube 5 fits tightly in the capillary tube opening 15.

Figure 3:
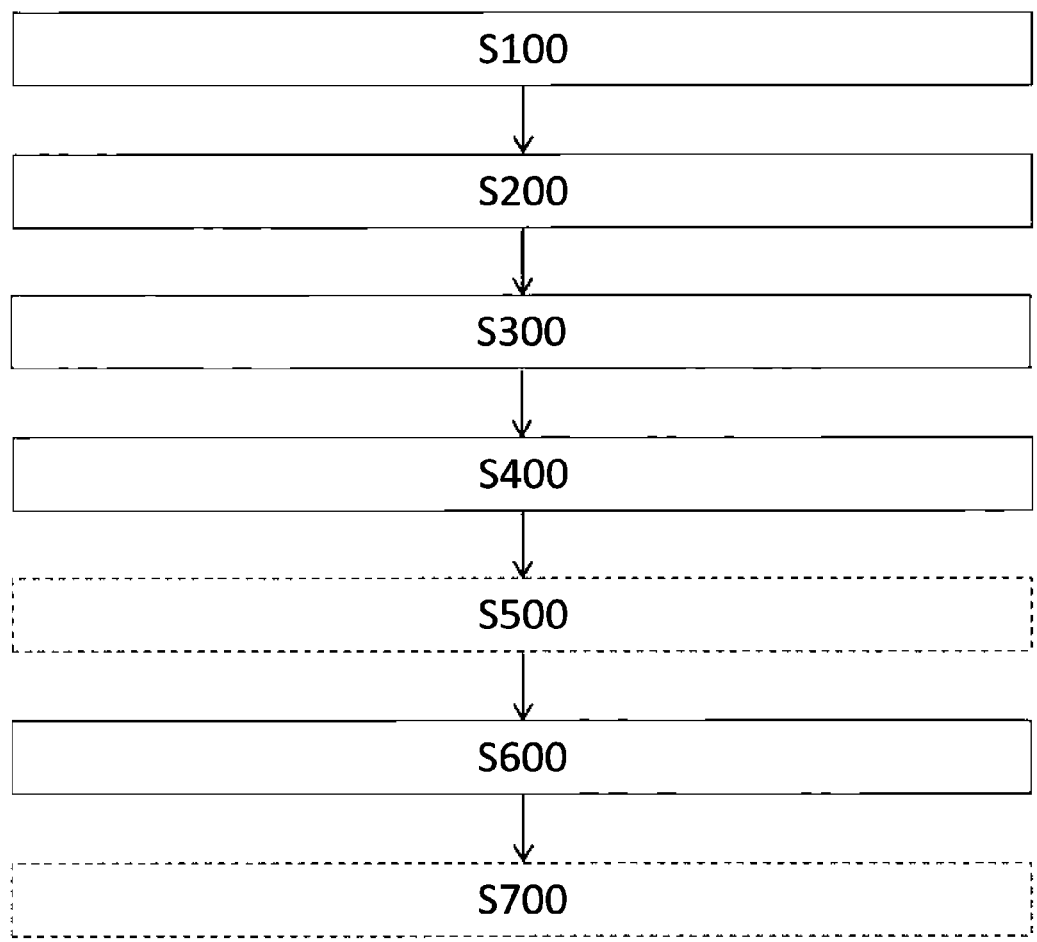
FIG. 3 shows an example of process flow of the method of the invention.

FIG. 3 is an example of process flow of the method of the invention, which provides method steps as follows.

In the first method step S100, the capillary adapter 3 and the pressure transmitter 2 are provided. These are preferably in the form of turned parts of a metal material, for example, stainless steel, manufactured in accordance with an above described form of embodiment.

In the second method step S200, the capillary adapter 3 is welded to the pressure transmitter 2. In contrast with the manufacturing process known from the state of the art, at the point in time of the welding of the capillary adapter to the pressure transmitter, the capillary tube is still not secured to the capillary adapter, so that an increased flexibility results for the welding.

In the third method step S300, the capillary tube 4 and the capillary tube interface 15 are arranged relative to one another. In such case, a variant can provide that the capillary tube 4 is introduced into the capillary tube opening as capillary tube interface 15. As above described, the capillary tube is, in such case, inserted into the capillary tube opening until it reaches the inner ledge serving as a stop. In the case of an alternative variant, the capillary tube 4 and the capillary tube interface 15 are arranged with butt orientation relative to one another.

In the fourth method step S400, the capillary tube is 4 welded to the capillary adapter 3. This is preferably performed by means of an orbital, TIG or laser welding process. In the case, in which an arrangement of the capillary tube 4 and the capillary tube interface occur with butt orientation, a butt weld is created.

Due to the externally lying weld seam, such can be processed further in an optional fifth step S500 following the fourth method step. Thus, for example, oxide film occurring during the welding can be reduced. The further processing of the weld seam leads to a less corrosion susceptible surface in the region of the weld seam.

In the sixth method step S600, the protective hose 5 is plugged onto the protective hose seat 16 of the capillary adapter 3 and preferably inserted into the annular depression.

In the seventh, again, optional method step S700, after the plugging of the protective hose onto the protective hose seat, the protective hose is secured in place. This can occur, for example, via a spot welding, in the case of which at least one spot weld, preferably a number of spot welds are made. Alternatively, the securement can also be implemented by pressing, such as crimping.

The invention claimed is:

1. A method of manufacturing a pressure transmitter system, the method comprising:
   providing a capillary adapter and a pressure transmitter, which includes a diaphragm platform and an isolating diaphragm, which is connected along at least one edge gas-tightly with the diaphragm platform to form a pressure chamber between the isolating diaphragm and the diaphragm platform;
   welding the capillary adapter to the pressure transmitter;
   arranging a capillary tube adjacent a capillary tube interface of the capillary adapter;
   welding the capillary tube to the capillary adapter; and
   connecting a protective hose onto a protective hose seat of the capillary adapter.

2. The method of claim 1, wherein the protective hose is affixed at least spot-wise to the capillary adapter after being connected onto the capillary adapter.

3. The method of claim 1, wherein the protective hose is affixed to the capillary adapter by spot welding.

4. The method of claim 1, wherein the protective hose is affixed by pressing protective hose against the capillary adapter.

5. The method of claim 1, wherein the welding of the capillary tube to the capillary adapter is performed using an orbital, tungsten inert gas or laser welding process.

6. The method of claim 1, wherein the capillary tube interface of the capillary adapter includes a first stop, and the capillary tube is arranged adjacent the capillary tube interface such that the capillary tube extends to the first stop.

7. The method of claim 1, wherein the capillary tube is arranged adjacent the capillary tube interface to enable the welding of the capillary tube to the capillary adapter with butt orientation.

8. The method of claim 1, wherein the protective hose is connected onto the protective hose seat such that protective hose extends to an outer ledge of the capillary adapter.

9. The method of claim 1, wherein the arranging of the capillary tube adjacent the capillary tube interface of the capillary adapter is performed after the welding of the capillary adapter to the pressure transmitter.

10. A pressure transmitter system comprising:
   a pressure transmitter;
   a capillary adapter that includes a basic body including an inner oil path extending in a longitudinal direction from a first end to a second end of the basic body, wherein the first end of the basic body includes a pressure transmitter connector by which the capillary adapter is connected to the pressure transmitter, and wherein the second end includes a capillary tube interface in fluid communication with the oil path;
   a capillary tube, wherein the capillary tube and the capillary tube interface are structured such that the capillary tube is disposed at a predetermined depth into the capillary tube interface, which closely surrounds the capillary tube; and a protective hose, wherein the second end of the basic body includes a protective hose seat structured such that the protective hose is connected over the protective hose seat with a press fit such that the protective hose seat extends at least partially into the protective hose.

11. The pressure transmitter system of claim 10, wherein the protective hose seat includes an outer first ledge against which the protective hose seats.

12. The pressure transmitter system of claim 10, wherein the capillary tube interface includes an inner second ledge upon which the capillary tube seats at a transition to the oil path.

13. The pressure transmitter system of claim 10, wherein the capillary tube interface has a constant inner diameter and extends to the inner second ledge.

14. The pressure transmitter system of claim 13, wherein the inner diameter of the capillary tube interface matches an outer diameter of the capillary tube such that the capillary tube is tightly surrounded by the capillary tube interface.

15. The pressure transmitter system of claim 10, wherein the pressure transmitter includes a diaphragm platform and an isolating diaphragm, the isolating diaphragm connected along at least one edge gas-tightly with the diaphragm platform to form a pressure chamber between the isolating diaphragm and the diaphragm platform, wherein a filling adapter with a filling closure is affixed to the diaphragm platform, and the capillary adapter is welded to the filling adapter of the pressure transmitter.

16. The pressure transmitter system of claim 10, wherein the pressure transmitter includes a diaphragm platform and an isolating diaphragm, the isolating diaphragm connected along at least one edge gas-tightly with the diaphragm platform to form a pressure chamber between the isolating diaphragm and the diaphragm platform, wherein the diaphragm platform includes a filling means, and the capillary adapter is welded to the diaphragm platform of the pressure transmitter.

* * * * *